United States Patent [19]
Thomson

[11] Patent Number: 5,818,029
[45] Date of Patent: Oct. 6, 1998

[54] METHOD AND APPARATUS FOR CONNECTING PCMCIA CARDS TO COMPUTER INTERFACES

[75] Inventor: Robert Bruce Thomson, Tokyo, Japan

[73] Assignee: Intermart Systems, Tokyo, Japan

[21] Appl. No.: 539,096

[22] Filed: Oct. 3, 1995

[51] Int. Cl.$^6$ ........................................................ G06K 7/00
[52] U.S. Cl. ........................ 235/486; 235/492; 235/487; 395/892; 439/946
[58] Field of Search .................................... 235/486, 492, 235/487; 395/892; 439/945, 946

[56] References Cited

U.S. PATENT DOCUMENTS

| | | | |
|---|---|---|---|
| 5,391,083 | 2/1995 | Roebuck et al. | 235/492 X |
| 5,472,351 | 12/1995 | Greco et al. | 235/492 X |
| 5,540,601 | 7/1996 | Botchek | 439/502 |
| 5,588,850 | 12/1996 | Pan et al. | 439/92 |

*Primary Examiner*—Donald T. Hajec
*Assistant Examiner*—Michael G. Lee
*Attorney, Agent, or Firm*—LaRiviere, Grubman & Payne

[57] ABSTRACT

A computer peripheral device for reading and writing cards conforming to the Personal Computer Memory Card International Association (PCMCIA) standard using a computer system equipped with a Small Computer Systems Interface (SCSI) bus. The device includes an Application Specific Integrated Circuit (ASIC), a gate array, a microprocessor unit, and a PC card interface unit. The PC card interface unit consists of a pair of latches, a bus transceiver, and a tri-state buffer. Data is transferred at high speed using a commercially available integrated circuit in a configuration in which the card is connected to the integrated circuit as if it were a random access memory buffer in a hard disk drive. Provision is made for automatically identifying the type of card inserted. Card slots are provided for two cards: one Type II card and one Type III card. Additional physical support is given to the card connector guides to prevent reverse card insertion.

6 Claims, 12 Drawing Sheets

METHOD AND APPARATUS FOR CONNECTING PCMCIA CARDS TO COMPUTER INTERFACES

TECHNICAL FIELD

The present invention relates to interfacing a PCMCIA card to a personal computer by way of a small computer systems interface (SCSI), and more particularly, to a PCMCIA read/write convertor coupled between a PCMCIA card and a personal computer for permitting the personal computer to recognize the PCMCIA read/write convertor and the PCMCIA card as a SCSI hard disk.

BACKGROUND

A number of computer peripheral devices are available today for use with computers. One such peripheral device is an external hard disk drive that is interfaced to a computer by means of a small computer systems interface (SCSI). A SCSI standard exists that defines the interconnections and governs the other parameters and specifications of SCSI peripheral devices. Special integrated circuits have been custom engineered to interface a random access memory (RAM) buffer in an external hard disk drive to an internal bus in a computer.

Another computer peripheral available today is a Personal Computer Memory Card International Association (PCMCIA) card that provides various extra capabilities to a computer. These PCMCIA cards are defined and specified in an existing PCMCIA standard.

Because of the small size of PCMCIA cards, they are most commonly used with portable computers such as laptop and palmtop computers. However, users of portable computers also have a need to connect the same PCMCIA cards to desktop computer systems in order to exchange information between the desktop computers and the portable computers.

Heretofore, a wide variety of card reader/writer devices have been proposed and implemented for accessing PCMCIA cards from desktop computers. These devices typically connect the PCMCIA card terminals directly to the personal computer's internal bus by taking advantage of the similarity of the PCMCIA electrical specification and the bus structure of computers based on certain existing microprocessor chips. However, many computer systems exist which have radically different bus structures, or do not easily permit a computer user to make a direct connection to its internal bus.

DISCLOSURE OF INVENTION

In accordance with the present invention, there is provided a host computer having a small computer systems interface (SCSI) to which is connected a PCMCIA read/write convertor constructed in accordance with the present invention. A PCMCIA card is connected to the host computer by plugging it into the PCMCIA read/write convertor of the present invention.

The PCMCIA read/write convertor includes an application specific integrated circuit (ASIC) which is normally used in a SCSI hard disk drive, and which normally has its address and data pins connected to a random access memory (RAM) buffer. The ASIC contains high speed circuitry for transferring data between the external SCSI bus and the RAM buffer without byte-by-byte control from an associated microprocessor unit. Although the ASIC was not intended by its manufacturer for other purposes, the PCMCIA read/write convertor of the present invention, is used to connect to an external PCMCIA card. The ASIC is not connected to a RAM buffer as in the intended application. Instead the ASIC is connected by driver circuitry to an external PCMCIA card with additional control signals provided from a gate array to make it appear to the ASIC that it is connected to a RAM buffer, and to make it appear to the PCMCIA card that it is connected to an internal computer bus. This unusual application of the standard ASIC component provides an extremely high performance data conversion with a very simple circuit at low cost.

Thus, the PCMCIA read/write convertor of the present invention comprises a microprocessor unit that controls the operation, an ASIC that interfaces with the SCSI, a gate array that produces some additional control signals, and four driver circuitry units that interface to the PCMCIA card. These four driver circuitry units are a pair of latches, a bus transceiver, and a tri-state buffer. An internal bus connects the data information and the address information from the ASIC to the PCMCIA card and also to the microprocessor unit.

Another feature of the present invention is the provision of a pair of surface mount card connectors that mount on opposite sides of a printed circuit board having a thickness of eight hundredths of one inch or greater, such that two identical cards inserted into the card connectors have the same orientation. A bezel is provided with one opening to allow insertion of a card designated as type III of the PCMCIA standard, and a second opening to allow the insertion of a card designated as type II of the PCMCIA standard. The additional spacing between the bezel openings provided by the extra printed circuit board thickness allows the user to easily remove one of two simultaneously inserted cards.

Yet another feature of the present invention is the provision of a plurality of supports on the printed circuit board which prevent lateral bending of the connector guides, thereby making it difficult for a user to insert a card with the wrong orientation, even if the card has slightly rounded corners.

Other features of the present invention are disclosed or apparent in the section entitled: "BEST MODE FOR CARRYING OUT THE PRESENT INVENTION."

BRIEF DESCRIPTION OF DRAWINGS

For a fuller understanding of the present invention, reference is made to the accompanying drawing taken in conjunction with the following detailed description of the Best Mode for Carrying Out the Present Invention. In the drawing.

Reference numerals refer to the same or equivalent parts of the present invention throughout the several figures of the drawing.

BEST MODE FOR CARRYING OUT THE PRESENT INVENTION

Figure 1:
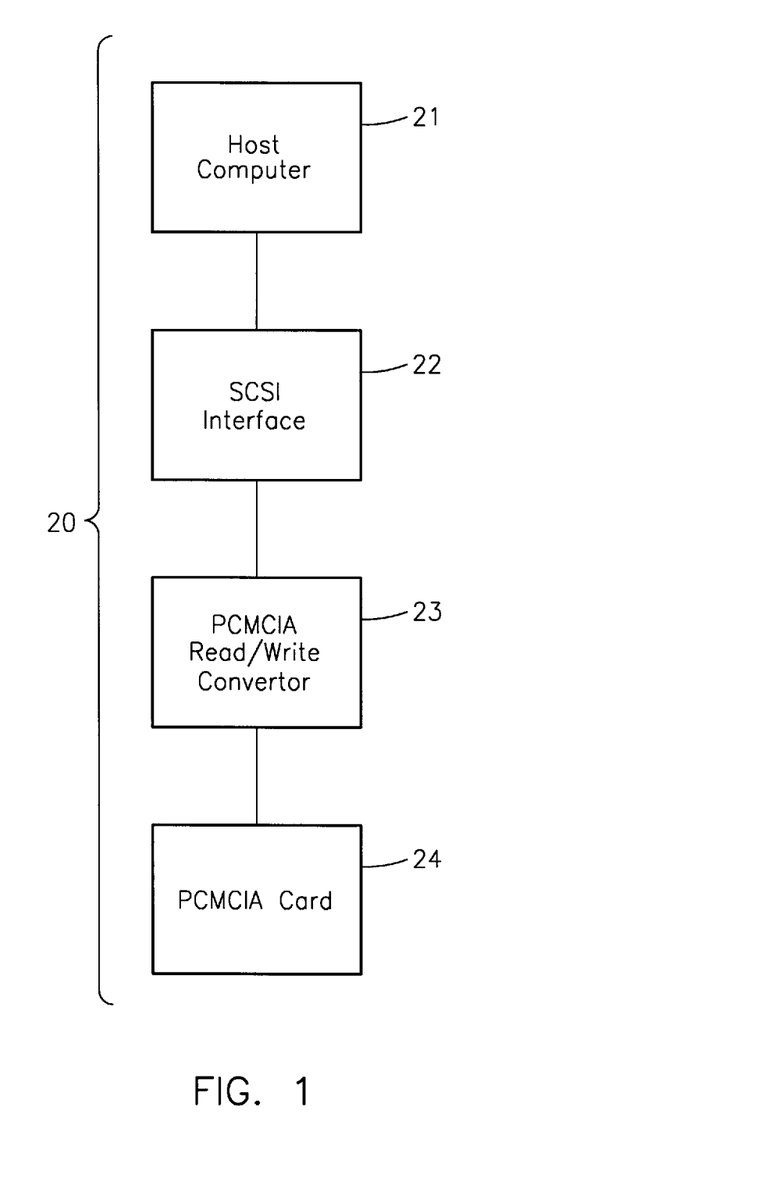
FIG. 1 is a block diagram of a computer system employing a PCMCIA read/write convertor in accordance with the present invention.

Referring now to FIG. 1 of the drawings, there is provided a computer system 20 comprising a host computer 21, a small computer systems interface (SCSI) 22, a PCMCIA read/write convertor 23 constructed in accordance with the principles of the present invention, and a PCMCIA card 24. The host computer 21 may be any conventional desktop computer system or personal computer such as an IBM PC or a Macintosh. The SCSI interface 22 may be any standard SCSI interface conventionally in use, and may be either external to the host computer 21 or may be built into it. The SCSI interface 22 conforms to an existing SCSI standard that permits high speed data transmission between the computer system 20 and a wide variety of external peripheral devices.

Figure 2:
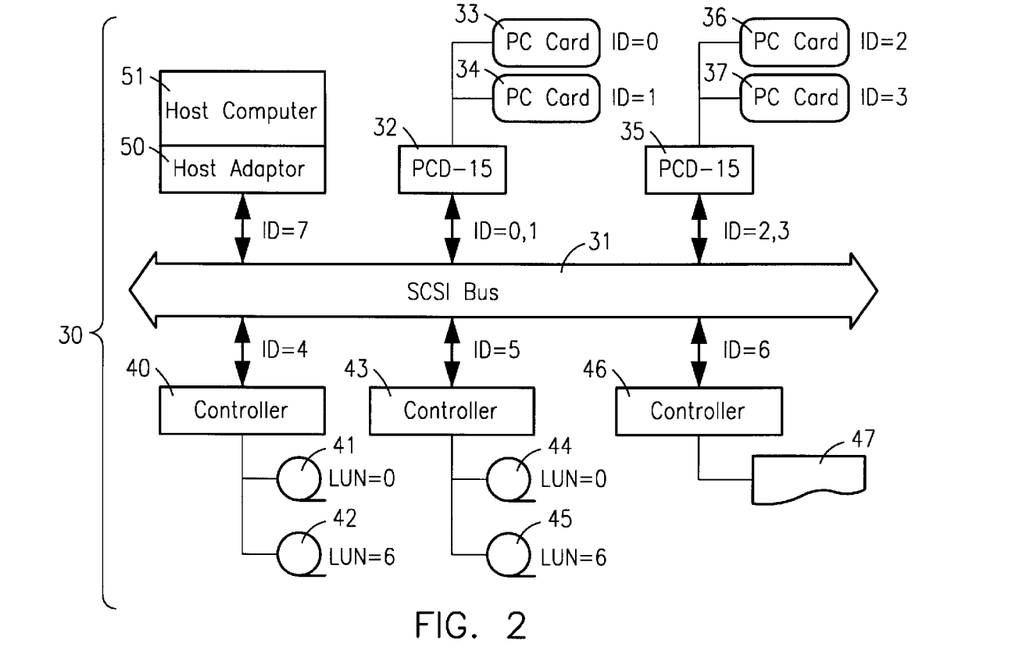
FIG. 2 is a block diagram of a computer system employing a plurality of PCMCIA read/write convertors in accordance with the present invention.

Referring now to FIG. 2, there is shown an example of a computer system 30 that employs a plurality of peripheral devices. This computer system 30 employs a SCSI bus 31, a first PCMCIA read/write convertor 32 connected to the SCSI bus 31, and first and second PCMCIA cards 33, 34 connected to the first PCMCIA read/write convertor 32.

A second PCMCIA read/write convertor 35 is connected to the SCSI bus 31 and has connected to it third and fourth PCMCIA cards 36 and 37. A first controller 40 is connected to the SCSI bus 31. First and second target logical units 41, 42 are connected to the first controller 40. A second controller 43 is connected to the SCSI bus 31 and has connected to it third and fourth target logical units 44, 45. A third controller 46 is connected to the SCSI bus 31 and is also connected to a printer which produces a hard copy document 47.

A host adapter 50 connects a host computer 51 to the SCSI bus 31. The first and second PCMCIA read/write convertors 32, 35 are targets operated by commands from the host computer 51. In the present example, up to eight SCSI devices may be connected to the SCSI bus 31. Each SCSI device is allocated a unique SCSI identification number from 1 to 7. Because the PCMCIA read/write convertors 32, 35 of the present invention have two PCMCIA card slots, they are allocated two SCSI identification numbers. These are not to be confused with the LUNs (logical unit number) assigned to target logical units 41, 42, 44 and 45.

The PCMCIA read/write convertors 32, 35 of the present invention are devices for connecting PCMCIA/JEIDA 4.1/4.2 specification PCMCIA cards to host computer SCSI interfaces. They conform to the SCSI-2 specification. If the PCMCIA card is a PCMCIA-ATA hard disk or flash disk, the PCMCIA read/write convertor 32, 35 uses the PC card's identify drive command to read the number of sectors and other information, which it converts into SCSI mode sense information. This enables access comparable to a SCSI hard disk from the host computer 51. If the PC card is a SRAM (static random access memory) or other memory device, the PCMCIA read/write convertor 32, 35 emulates a disk. This permits the PCMCIA read/write convertor 32, 35 to be used as the boot device, and special driver software is not required.

By using the proper commands, it is possible to access the PCMCIA card's attribute section and common memory section directly. Disk emulation may then be performed by driver software. In this example, any kind of PC card can be accommodated, not just storage media.

It should be understood that the computer system 30 of FIG. 2 accommodates high speed data transfer. The maximum data transfer rate is: synchronous at 4 megabits per second or asynchronous at 3 megabits per second.

The host computer 51 may employ an interface such as an AdaptecAHA-1640 host adaptor, or an ISA bus computer such as an AdaptecAHA-1522 host adapter. The host computer 51 may be a Macintosh, in which case the host adaptor 50 may be a Silverlining, Espresso, or other driver. In addition, the host computer 51 may be a Silicon Graphics workstation, if desired.

The PCMCIA cards 33, 34, 36, 37 may be PCMCIA-ATA cards such as those provided by SunDisk, Maxtor, Ministor, SyQuest, IBM, Nikon, and Fujix. The cards accommodated may also be SRAM cards, Modem cards, LAN cards or Cryptography cards.

Figure 3:
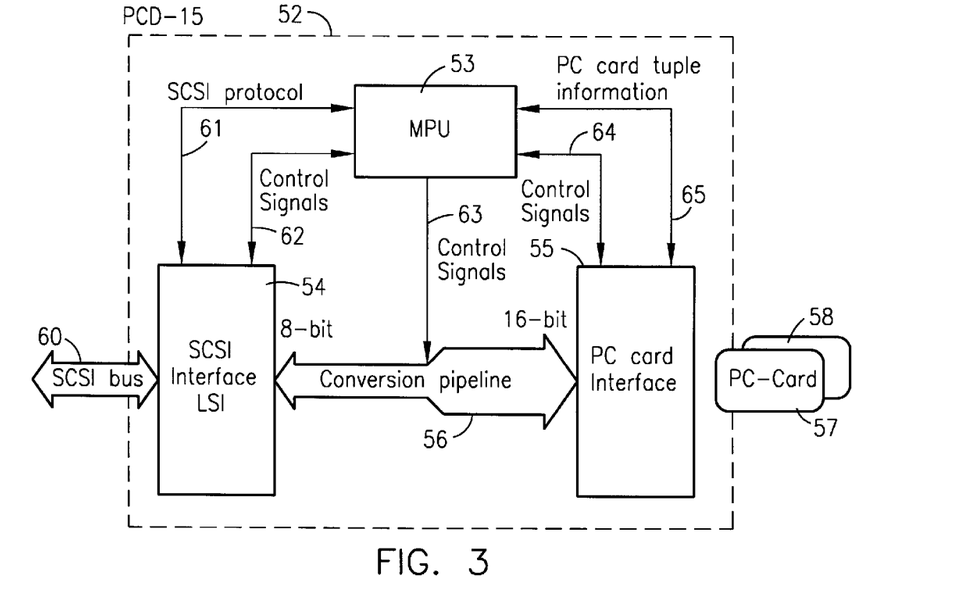
FIG. 3 is a block diagram illustrating the signal flow inside the PCMCIA read/write convertors of FIG. 1 and FIG. 2.

FIG. 3 is a simplified block diagram of the major internal components of a PCMCIA read/write convertor 52 constructed in accordance with the principles of the present invention. This PCMCIA read/write convertor 52 is suitable for use as the PCMCIA read/write convertor 32 and 35 shown in FIG. 2 and the PCMCIA read/write convertor 23 of FIG. 1. The simplified diagram of FIG. 3 is for the purpose of showing the information flow between the various major components.

The PCMCIA read/write convertor 52 comprises a microprocessor unit 53, a SCSI interface ASIC 54, and a PC card interface 55. A conversion pipeline 56 is shown connecting between the SCSI interface ASIC 54 and the PC card interface 55. A pair of PC cards 57, 58 are shown adjacent to the PC card interface 55. A SCSI bus 60 is shown connecting to the SCSI interface ASIC 54. The left hand end of the SCSI bus 60 goes to the host computer (not shown).

The microprocessor unit 53 controls the operation of the PCMCIA read/write convertor 52, and a connection 61 is shown providing the SCSI protocol between the microprocessor unit 53 and the SCSI interface ASIC 54. A second connection 62 provides control signals between the microprocessor unit 53 and the SCSI interface ASIC 54. A third connection 63 is shown applying control signals from the microprocessor unit 53 to the conversion pipeline 56. A fourth connection 64 applies control signals between the microprocessor unit 53 and the PC card interface 55. Finally, a fifth connection 65 provides PC card tuple information from the PC card interface 55 to the microprocessor unit 53. This PC card tuple information relates to reading or writing information in two bytes: a lower byte, and an upper byte. This makes possible the conversion from 8-bits to 16-bits, and vice versa. As indicated in FIG. 3, the conversion pipeline 56 converts 8 bit information to 16 bit information from the ASIC 54 to the PC card interface 55, and vice versa.

The microprocessor unit 53 controls the SCSI interface ASIC 54 and the PC card interface 55, but the data, rather than passing through the microprocessor unit 53, is transferred directly between the SCSI interface ASIC 54 and the PC card interface 55 by the conversion pipeline 56, thereby making extremely high data transfer rates possible. The SCSI interface ASIC 54 employed for the PCMCIA read/write convertor 52 controls the physical SCSI interface and handshaking for highly reliable high speed SCSI transfers. The SCSI interface ASIC 54 is an existing model which is normally used in a SCSI hard disk drive, and normally has its address and data pins connected to a RAM buffer. The SCSI interface ASIC 54 comprises high speed circuitry for transferring data between an external SCSI bus 60 and a RAM buffer without byte-by-byte control. Although the SCSI interface ASIC 54 was not intended by its manufacturer for the present purpose, in the present invention the ASIC 54 is used to transfer data to and from the PCMCIA cards 57, 58.

Figure 4:
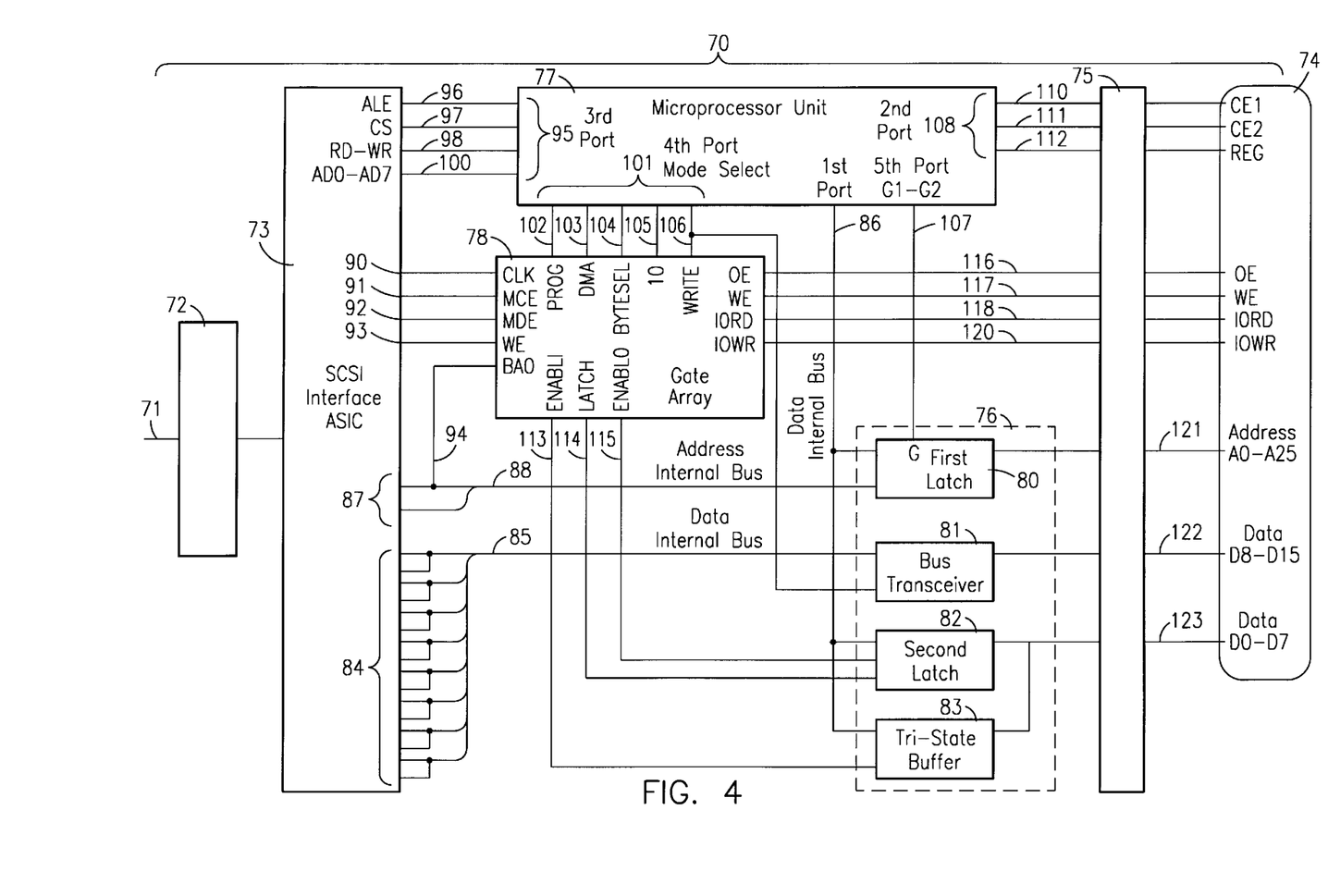
FIG. 4 is a block diagram of the PCMCIA read/write convertor of FIG. 3 illustrating the connections between the several components thereof, said components including an application specific integrated circuit (ASIC).

FIG. 4 is a block diagram of a PCMCIA read/write convertor 70 schematically showing the electrical interconnection of its constituent elements. At the left side of FIG. 4, a SCSI bus 71 connects by way of a first connector 72 to a SCSI interface ASIC 73. On the right hand side, a PC card interface 76 interfaces a PCMCIA card 74 by way of a second connector 75. A microprocessor unit 77 along with a gate array 78 provides control signals to control data transfer between the PCMCIA card 74 and the SCSI bus 71, and vice versa. As is well known, the gate array 78 comprises an array of logic gates disposed on an integrated circuit chip, and interconnected in a predetermined manner to provide desired output signals when certain input signals are applied. The PC card interface 76 comprises a first latch 80, a bus transceiver 81, a second latch 82, and a tri-state buffer 83.

Although other models may be used, the SCSI interface ASIC 73 may be a model SH370 integrated circuit made by Cirrus Logic, the microprocessor unit 77 may be a model MC68HC711 integrated circuit made by Motorola, the gate array 78 may be a model GAL22V10 integrated circuit made by Lattice. Similarly, the latches 80 and 82, the bus transceiver 81, and the tri-state buffer 83 may be models 74HC573, 74HC245 and 74HC244, respectively, made by Motorola. These part numbers are given by way of example only.

The microprocessor unit 77 is provided with five ports 86, 108, 95, 101, and 107. The first port 86 connects to the data internal bus 85. The second port 108 connects to the PCMCIA card 74 via the first connector 75. The third port 95 connects to the SCSI interface ASIC 73. The fourth port 101 connects to the gate array 78. Finally, the fifth port connects to the first latch 80.

Data terminals 84 provided on the SCSI interface ASIC 73 are connected via an internal data bus 85 to the latches 80, 82, to the bus transceiver 81, to the tri-state buffer 83, and to the first port 86 of the microprocessor unit 77. Address terminals 87 provided on the SCSI interface ASIC 73 are connected by way of an internal address bus 88 to the first latch 80.

A clock terminal 90, an MCE control terminal 91, an MOE control terminal 92 and a WE control terminal 93, all on the SCSI interface ASIC 73, are connected to the gate array 78. From the data terminals 84 on the SCSI interface ASIC 73, a BA0 connector 94 is connected to the gate array 78. Control signals from the microprocessor unit 77 are provided to the SCSI interface ASIC 73 from the third port 95 of the microprocessor unit 77. These control signals are connected to an ALE terminal 96, a CS terminal 97, an RD-WR terminal 98, and an AD0–AD7 terminal 100, all on the ASIC 73.

Mode select signals are provided from the fourth port 101 on the microprocessor unit 77 to the gate array 78. These mode select signals are connected to a PROG terminal 102, a DMA terminal 103, a BYTESEL terminal 104, an INPUT OUTPUT (IO) terminal 105, and a WRITE terminal 106, all on the gate array 78. In addition, the WRITE signal at terminal 106 is also connected to an input of the bus transceiver 81. The fifth port 107 on the microprocessor unit 77 applies a control signal to the first latch 80. The second port 108 on the microprocessor unit 77 applies control signals to the PCMCIA card 74 by way of the second connector 75. These signals are connected to a CE1 terminal 110, a CE2 terminal 111, and an REG terminal 112.

The REG signal at terminal 112 is used to select access to one of two independent memory regions of the card as defined in the PCMCIA standard. The first, attribute memory, is used for accessing special information such as details on the type of card. Common memory is used for access to user data. These regions are not exactly memory in the strict sense and are better viewed as access ports to internal card circuitry.

The gate array 78 applies a control signal via a ENABLI terminal 113 to the tri-state buffer 83, applies a LATCH signal via a LATCH terminal 114 to the second latch 82, and applies a control signal via a ENABLO terminal 115 to the second latch 82.

The gate array 78 also applies control signals to the PCMCIA card 74 via the second connector 75. These control signals are applied via an OE connection 116, a WE connection 117, an IORD connection 118, and an IOWR connection 120. The first latch 80 is connected via the second connector 75 to the PCMCIA card 74 at an A0–A25 address terminal 121. The bus transceiver 81 is connected via the second connector 75 to the PCMCIA card at a D8–D15 data terminal 122. The tri-state buffer 83 is connected to the second latch 82, and that connection is connected via the second connector 75 to the PCMCIA card 74 at a D0–D7 data terminal 123.

Figure 5:
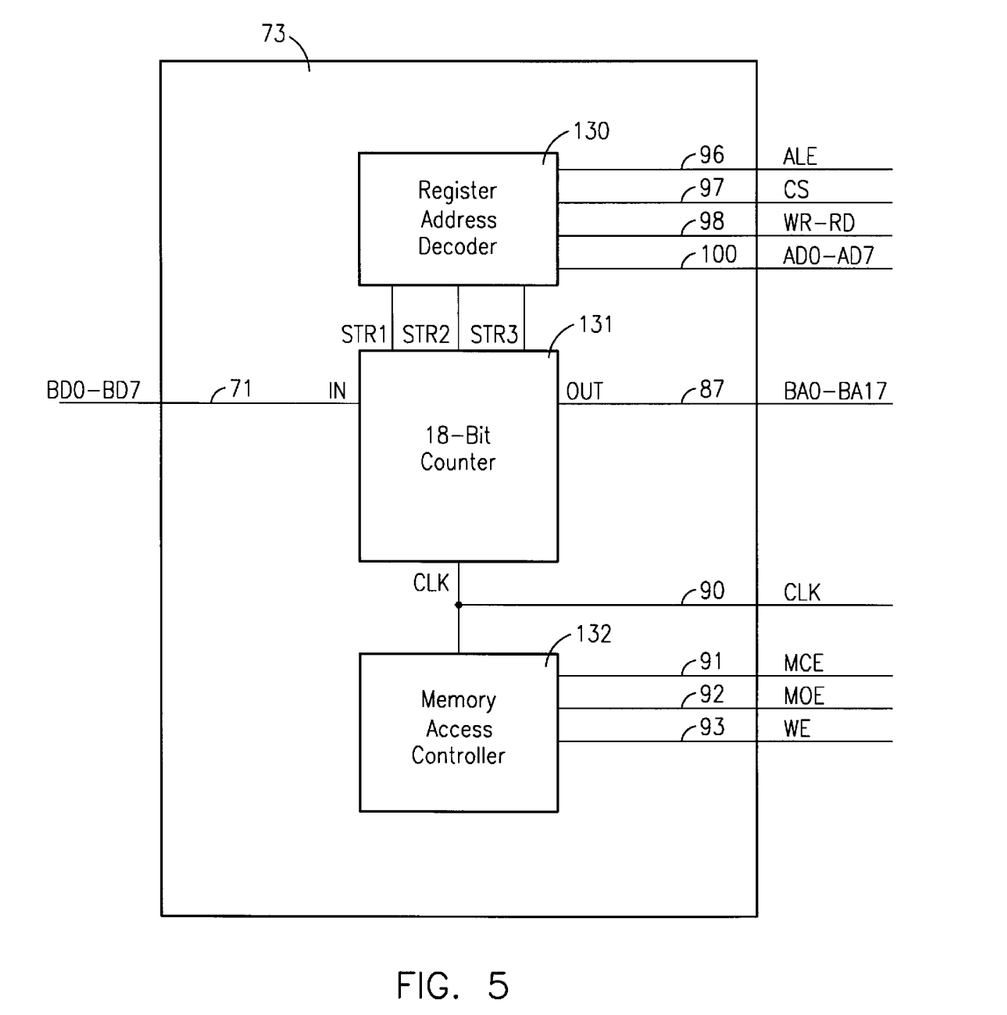
FIG. 5 is a block diagram of some of the internal components of the ASIC shown in FIG. 4.

Referring now to FIG. 5, there is shown a block diagram of a portion of the internal arrangement of the SCSI interface ASIC 73 of FIG. 4. The SCSI interface ASIC 73 comprises a register address decoder 130, an 18-bit counter 131, and a memory access controller 132. The register address decoder 130 provides three strobes labeled STR1, STR2, and STR3 to the 18-bit counter 131. The register address decoder 130 also provides signals to the ALE terminal 96, the CS terminal 97, the RD-WR terminal 98, and the AD0–AD7 terminal 100. The 18-bit counter 131 connects to the BA0–BA17 address terminal 87 and to the SCSI bus 71. The memory access controller 132 provides a clock signal to the 18-bit counter 131, and connects to the clock terminal 90 of the SCSI interface ASIC 73. The memory access controller 132 is also connected to the MCE control terminal 91, the MOE control terminal 92, and to the WE control terminal 93.

In operation, when a PCMCIA card 74 is connected to the PCMCIA read/write convertor 70, information from internal card information structure of the PCMCIA card 74 is read by the microprocessor unit 77 and utilized to determine the type of PCMCIA card 74 and other parameters such as data capacity and maximum transfer rate. There are two methods available for accessing the PCMCIA card 74.

In the first method for accessing the PCMCIA card 74, when the card 74 is logically similar to a hard disk, such as a random access memory card, flash memory card, or a hard disk card, memory areas on the card 74 are mapped into equivalent disk addresses so that the host computer 21 (FIG. 1) recognizes the PCMCIA read/write converter 70 and the PCMCIA card 74 as a SCSI hard disk drive. In this case, a SCSI command from the host computer 21 to read or write a given disk sector is interpreted by the PCMCIA read/write converter 70 as the corresponding READ or WRITE command to or from the card memory area to which that sector is mapped.

The second method for accessing the PCMCIA card 74 is for any PCMCIA card 74 including the types listed above, and additionally including other types of cards such as modems and printers. These cards 74 may be accessed by SCSI commands which have been defined specifically for the PCMCIA read/write converter 70 of the present invention. These commands allow the host computer 21 to access all features of the card as defined by the PCMCIA specification regardless of whether corresponding features exist in the original SCSI specification. Specifically, a SCSI command from the host computer 21 to read or write a specific range of memory locations in the attribute memory or the common memory of the PCMCIA card 74 is converted by the PCMCIA read/write adaptor 70 into the equivalent PCMCIA READ and WRITE commands.

The microprocessor unit 77 in FIG. 4, controls the SCSI interface ASIC 73 and the PCMCIA interface 76, but the data, rather than passing through the microprocessor unit 77 is transferred directly between the SCSI interface ASIC 73 and the PCMCIA interface 76 by the internal data bus 85, thereby making extremely high data transfer rates possible. The SCSI interface ASIC 73 employed controls the physical SCSI interface and handshaking for highly reliable, high speed SCSI transfers.

Operation is initiated by the host computer 21 (FIG. 1) by a selection signal on the SCSI bus 71. This selection signal is recognized automatically by the SCSI interface ASIC 73. The microprocessor unit 77 polls the SCSI interface ASIC 73 to determine whether the PCMCIA read/write converter 70 is selected. When selection occurs, the microprocessor unit 77 directs the SCSI interface ASIC 73 to read a single SCSI command from the host computer 21. The microprocessor unit 77 interprets the command and initiates and controls data transfers as requested.

The transfer of data from the host computer 21 to the PCMCIA interface card 74 is accomplished when registers (not shown) in the SCSI interface ASIC 73 specify the transfer address in the PCMCIA card 74 and also specify the transfer direction and the number of bytes to be transferred. Registers in the SCSI interface ASIC 73 are initialized by the microprocessor unit 77, and a transfer start bit is then set in the SCSI interface ASIC 73. The MCE control terminal 91 and the WE control terminal 93 are automatically strobed on each byte by the ASIC 73. In accordance with the original design of the ASIC 73, these signals were intended to be used by a random access memory buffer for accepting bytes of data from the SCSI interface ASIC 73. However, in the PCMCIA read/write convertor 70 of the present invention, these signals are processed by the gate array 78, which generates a signal on the IOWR connection 120 or the WE connection 117 that goes to the PCMCIA card 74. The gate array 78 also applies a signal to the LATCH terminal 114 which sends a signal to the second latch 82. Data is then transmitted from the data terminals 84 of the SCSI interface ASIC 73. The data is transmitted over the internal data bus 85. Even numbered 8-bit bytes of data sent by the SCSI interface ASIC 73 are latched by the second latch 82. Odd numbered bytes sent by the SCSI interface ASIC 73 are sent through the bus transceiver 81. Together, the data bytes from the second latch 82 and the data bytes from the bus transceiver 81 are transmitted to the PCMCIA card 74, and together form 16-bit words of data D0–D15 which are accepted by the PCMCIA card 74 when it is strobed by the IOWR or WE signal.

Data transfer in the opposite direction, from the PCMCIA card 74 to the host computer 21, is accomplished as follows. Registers in the SCSI interface ASIC 73 specifying the transfer address, the transfer direction and the number of bytes to be transferred are initialized by the microprocessor unit 77. Then a transfer start bit is set in the SCSI interface ASIC 73. The MCE control terminal 91 and the MOE control terminal 92 are automatically strobed on each byte. In accordance with the original design of the ASIC 73, these signals were intended to be used by a random access memory buffer for transferring bytes of data to the SCSI interface ASIC 73. However, in the PCMCIA read/write converter 70 of the present invention, these signals are processed by the gate array 78 to generate signals at the IORD connection 118 or the OE connection 116 for the PCMCIA card 74. The gate array 78 also sends a signal via the LATCH terminal 114 to the second latch 82. The lower 8 data bits, D0–D7 on the PCMCIA card 74 are sent via a data terminal 123 and the second connector 75 where they are latched in the second latch 82. The upper 8 bits, D8–D15, are transmitted via a data terminal 122 and the second connector 75 to the bus transceiver 81. These data bits are accepted by the ASIC 73 in response to an MOE signal from the gate array 78 applied to the ASIC via control terminal 92.

In either transfer of data from the host computer 21 to the PCMCIA card 74, or the transfer of data from the PCMCIA card 74 to the host computer 21, the data is sent between the host computer 21 and the PCMCIA card 74 without byte-by-byte intervention by the microprocessor unit 77. In the case where the microprocessor unit 77 needs to examine the card information structure or other data on the card directly, a different transfer method is used. To examine the card information structure, the microprocessor unit 77 applies a signal to the PROG terminal 102 which is applied to the gate array 78. This signal is strobed by the microprocessor unit 77 to generate outgoing control signals from the gate array 78 on the OE connection 116 or the WE connection 117 to the PCMCIA card 74 on a byte-by-byte basis. Data from the PCMCIA card 74 is transferred to or from the pins of the first port 86 on the microprocessor unit 77. In the event that the microprocessor unit 77 needs to examine SCSI commands or other SCSI data directly, a different transfer method is used. The microprocessor unit 77 generates a command at the third port 95 on the CS terminal 97, on the ALE terminal 96, and either an RD or a WR signal on the RD-WR terminal 98. These signals from the third port 95 of the microprocessor unit 77 are applied to the SCSI interface ASIC 73. The data is transferred between the data terminals 84 of the SCSI interface ASIC 73 and the first port 86 of the microprocessor unit 77.

The gate array 78 operates as follows. The basic operation mode is first set by the microprocessor unit 77. Mode select is performed by applying signals at the fourth port 101 of the microprocessor unit 77. The basic operation mode is set by applying a signal to the IO terminal 105 and the WRITE terminal 106. On the IO terminal 105, a 0 is equal to memory transfer while a 1 is equal to an IO port transfer as defined by the PCMCIA standard. On the WRITE terminal 106, a 0 is equal to write to the card, and a 1 is equal to read the card. To read a single byte of data, the microprocessor unit 77 initializes an address counter in the SCSI interface ASIC 73, asserts a signal on the CE 1 terminal 110 at the second port 108, and then strobes the PROG terminal 102 at the fourth port 101. The gate array 78 generates a strobe on the OE connection 116 or on the IORD connection 118, enabling D0–D7 data output from terminal 123 on the PCMCIA card 74. The gate array 78 also asserts a signal on ENABLI terminal 113. This latter signal enables transmission of the data to the tri-state buffer 83 and onto the internal data bus 85. The microprocessor unit 77 then reads the data from the internal data bus 85 to the first port 86. In the case of reading a 16-bit word of data, the microprocessor unit 77 additionally asserts a signal on the CE 2 terminal 111 to enable a full word of output from the PCMCIA card 74 of D0–D15 data on the data pins 122, 123. After reading the lower byte as described above, the upper byte is read by asserting a signal at the fourth port 101 on the BYTESEL terminal 104. This latter signal deasserts the ENABLI signal on terminal 113 and asserts an ENABH signal on terminal 115, transmitting the upper D8–D15 byte from the data terminal 122 onto the internal data bus 85 for access by the microprocessor unit 77 at the first port 86.

To write a single byte of data to the PCMCIA card 74, the microprocessor unit 77 proceeds in the same way as for a read, except that the WRITE signal at terminal 106 is set low. Applying a strobe signal to the PROG terminal 102 of the gate array 78 when the WRITE signal at terminal 106 is set low, generates a strobe signal to the WE connection 117 or the IOWR connection 120 that is applied to the PCMCIA card 74. The gate array 78 also asserts an ENABLO signal at terminal 115. D0–D7 data output from the first port 86 of the microprocessor unit 77 to the internal data bus 85 is transmitted through the second latch 82 to data terminal 123 of the PCMCIA card 74. To write a 16-bit word instead of a single byte of data, the microprocessor unit 77 additionally asserts a signal on the CE 2 terminal 111 at the second port 108. After strobing the PROG terminal 102, the byte of data transmitted to the second latch 82 is latched by asserting a signal at the BYTESEL terminal 104 at the fourth port 101. The gate array 78 in turn asserts a signal on the LATCH terminal 114 causing the second latch 82 to latch the byte. In addition, the gate array 78 asserts a signal on the WRITE terminal 106, preparing the bus transceiver 81 for data output. The microprocessor unit 77 then applies a second byte of data D8–D15 onto the internal data bus 85 which passes through the bus transceiver 81 and is presented to the second byte data terminal 122 of the PCMCIA card 74, together with the first byte D0–D7, which is the output from the second latch 82 onto the first byte data terminal 123.

To read a sequence of words automatically from the PCMCIA card 74 and transfer them to the SCSI bus 71, the microprocessor unit 77 initializes an address counter and a transfer length in the SCSI interface ASIC 73 and asserts a signal at the DMA terminal 103 at the fourth port 101. The microprocessor 77 also asserts a signal at the CE 1 terminal 110 and the CE 2 terminal 111 at the second port 108. The microprocessor 77 then sets a transfer start bit in the SCSI interface ASIC 73. To read each byte, the ASIC 73 sends the next address from its internal counter via the internal address bus 88 to the PCMCIA card 74 through the first latch 80. The SCSI interface ASIC 73 asserts signals on the MCE terminal 91 and the MOE terminal 92 that are applied to the gate array 78. To convert 16-bit data from the PCMCIA card 74 into 8-bit data for the ASIC 73, the gate array 78 generates one long strobe on the OE connection 116 or on the IORD connection 118 to read an entire word D0–D15 onto the two data terminals 123 and 122 in response to two consecutive strobes on the MCE terminal 91 and the MOE terminal 92. The gate array 78 examines the signal on the BA0 connection 94 to determine whether a given byte requested by the ASIC 73 is from an even or an odd address. Based on BA0, the gate array 78 asserts first a signal on the ENABLI terminal 113, and then on the ENABLO terminal 115 to read first the lower then the upper byte from the PCMCIA card 74 onto the internal data bus 85 for input to the ASIC 73 at the data terminals 84. Because the transfer rate of the ASIC 73 is dependent on the asynchronous transfer rate on the SCSI bus 71 to the host computer 21, time between strobes on the MCE terminal 91 and the MOE terminal 92 can vary widely. Because the ASIC 73 was designed to be used with a random access memory buffer, it achieves maximum speed on bursts by leaving the signal asserted on the MCE terminal 91 and on the MOE terminal 92 for multiple cycles, changing only the address between bytes. When the ASIC 73 is waiting for the host computer 21, however, it deasserts these signals. Because the PCMCIA standard requires complete strobes on each word, the gate array 78 must use address transitions to generate deassertions of the OE signal at connection 116 or of the IORD signal at connection 118 between words. This additional processing is necessary to achieve proper operation with high speed host computers such as a Macintosh Quadra, for example.

To write a sequence of words automatically from the SCSI bus 71 to the PCMCIA card 74, the microprocessor unit 77 initializes an address counter and a transfer length in the ASIC 73. At the fourth port 101, the microprocessor unit 77 asserts a signal at the DMA terminal 103 and at the write terminal 106. At the second port 108, the microprocessor unit 77 asserts a signal at the CE 1 terminal 110 and at the CE 2 terminal 111. The microprocessor unit 77 then sets a transfer start bit in the ASIC 73. To write each byte, the ASIC 73 sends the next address from its internal counter to the PCMCIA card 74 through the first latch 80 and asserts signals at the MCE terminal 91 and the MOE terminal 92. To convert 8-bit data from the ASIC 73 to 16-bit data for the PCMCIA card 74, the gate array 78 asserts a signal at the LATCH terminal 114 to latch the lower byte into the second latch 82, and sends the upper byte to the bus transceiver 81. With both bytes present on the card inputs at the two data terminals 122 and 123, the gate array 78 strobes the WE connection 117 or the IOWR connection 120 to signal the PCMCIA card 74 to accept the data.

Address generation is accomplished as follows. The PCMCIA card 74 has 26 bits of address input, A0–A25, while the SCSI interface ASIC 73 has only 18 bits of address output, BA0–BA17. The upper 8 bits of the address, A18–A25, are therefore set by the microprocessor unit 77 directly into the upper 8 bits of the first latch 80. This is accomplished by applying the desired upper 8 bits onto the address internal bus 88, and asserting a G2 signal at the fifth port 107. The G2 signal is applied to the first latch 80. The lower 18 bits A0–A17 of the address are output by an 18-bit counter 131 (See FIG. 5) in the ASIC 73. Loaded by the microprocessor unit 77 before each transfer, the 18-bit counter 131 is automatically incremented after each byte is transferred. If the PCMCIA card 74 being accessed is a memory card, the address is incremented during the transfer, so the address from the 18-bit counter 131 is sent through the first latch 80 to the PCMCIA card 74. For PCMCIA-ATA specification cards, such as hard disk cards, the address needs to be constant throughout the transfer, so the microprocessor unit 77 applies a G1 signal from the fifth port 107 to the first latch 80 to latch the initial address for the duration of the transfer.

The 18-bit counter 131, shown in FIG. 5, is initialized by loading the transfer start address BD0–BD7. To load the full 18-bit width, three separate strobes are needed: STR1, STR2, and STR3. These three separate strobes load from the D0–D7, D8–D15, and D16–D17 inputs of the 18-bit counter 131, respectively. The strobes are generated by the register address decoder 130 (FIG. 5), which in turn responds to the register addresses of the lower, middle and upper portions of the counter 131 appearing on the AD0–AD7 terminal 100 in combination with strobes on the ALE terminal 96, the CS terminal 97 and the RD-WR terminal 98. After the initialization, the 18-bit counter 131 is advanced during gated transfers by clock pulses (CLK) from the memory access controller 132. The memory access controller 132 also generates signals for the MCE terminal 91, the MOE terminal 92 and the WE terminal 93 to request data transfer to or from circuitry external to the ASIC 73. The generation of the strobes STR1, STR2 and STR3, and the advancement of the 18-bit counter 131 are handled without any intervention of the microprocessor unit 77, so that the data transfer can be made at extremely high speed.

Figure 6:
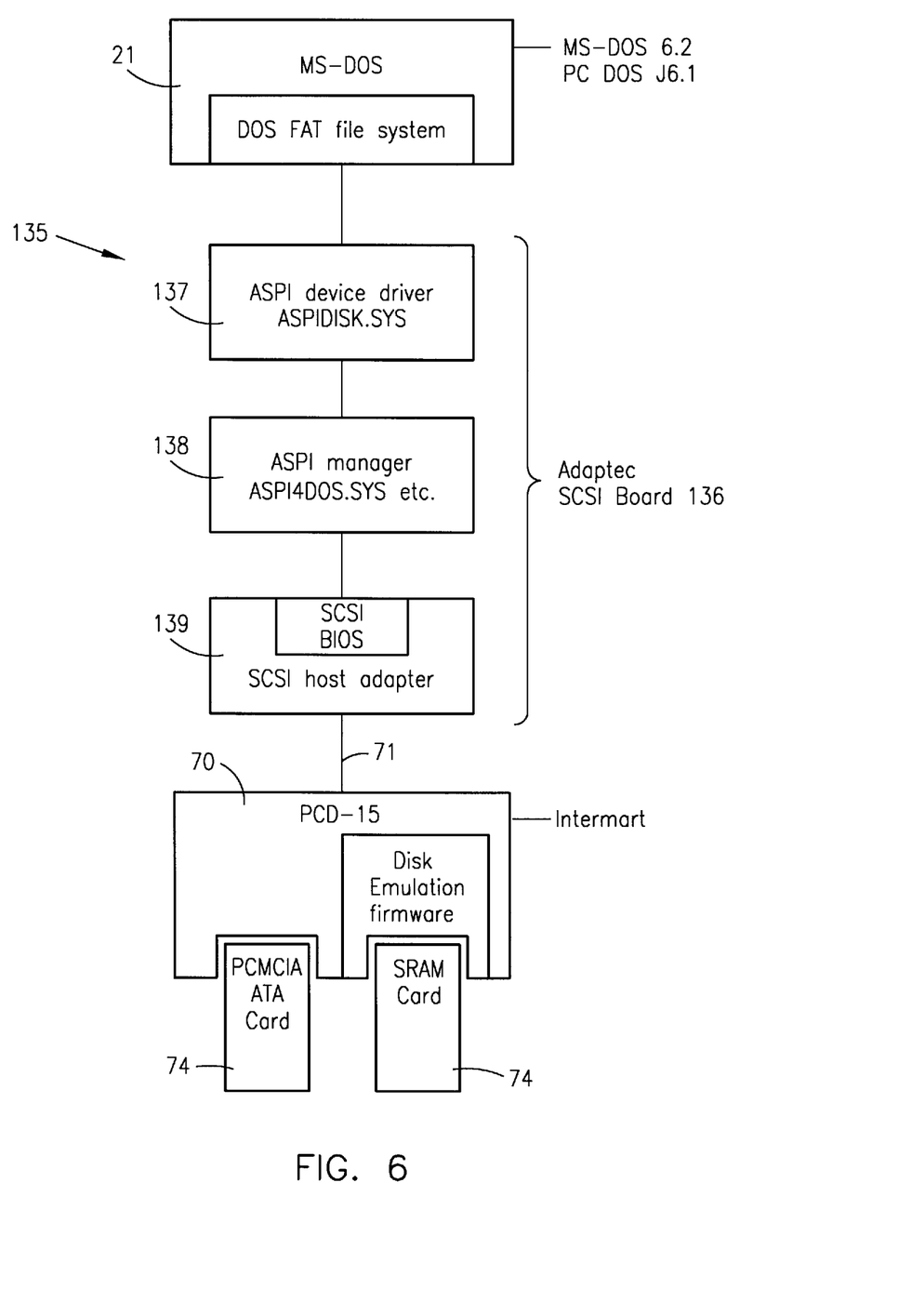
FIG. 6 is a block diagram of a first example of the connection of a PCMCIA read/write convertor of the present invention to a computer system employing MS-DOS as the operating system.

FIG. 6 is a diagram illustrating the connection of a PCMCIA convertor 70 of the present invention to a computer system 135 that employs MS-DOS as the operating system.

FIG. 6 is an example of utilization of hardware and software configuration to adapt two PCMCIA cards 74 so that they emulate a SCSI disk. In this example, a SCSI board 136 is employed and is connected in between the PCMCIA read/write convertor 70 and the host computer 21. This SCSI board 136 may be of the type manufactured by Adaptec, for example, although others may be employed. The SCSI board 136 employs the Adaptec EZ-SCSI driver software. This SCSI board 136 is provided with ASPIDISK.SYS 137, which is one of the EZ-SCSI device drivers, and the unit is also provided with a function to read data from the PCMCIA card 74 recorded with a digital still camera. For installation of Adaptec's SCSI board 136 and EZ-SCSI software, reference is made to the Adaptec User Manuals. The Adaptec SCSI board 136 also includes a ASPI4DOS.SYS manager 138 and a SCSI host adaptor 139 including a SCSI BIOS.

Figure 7:
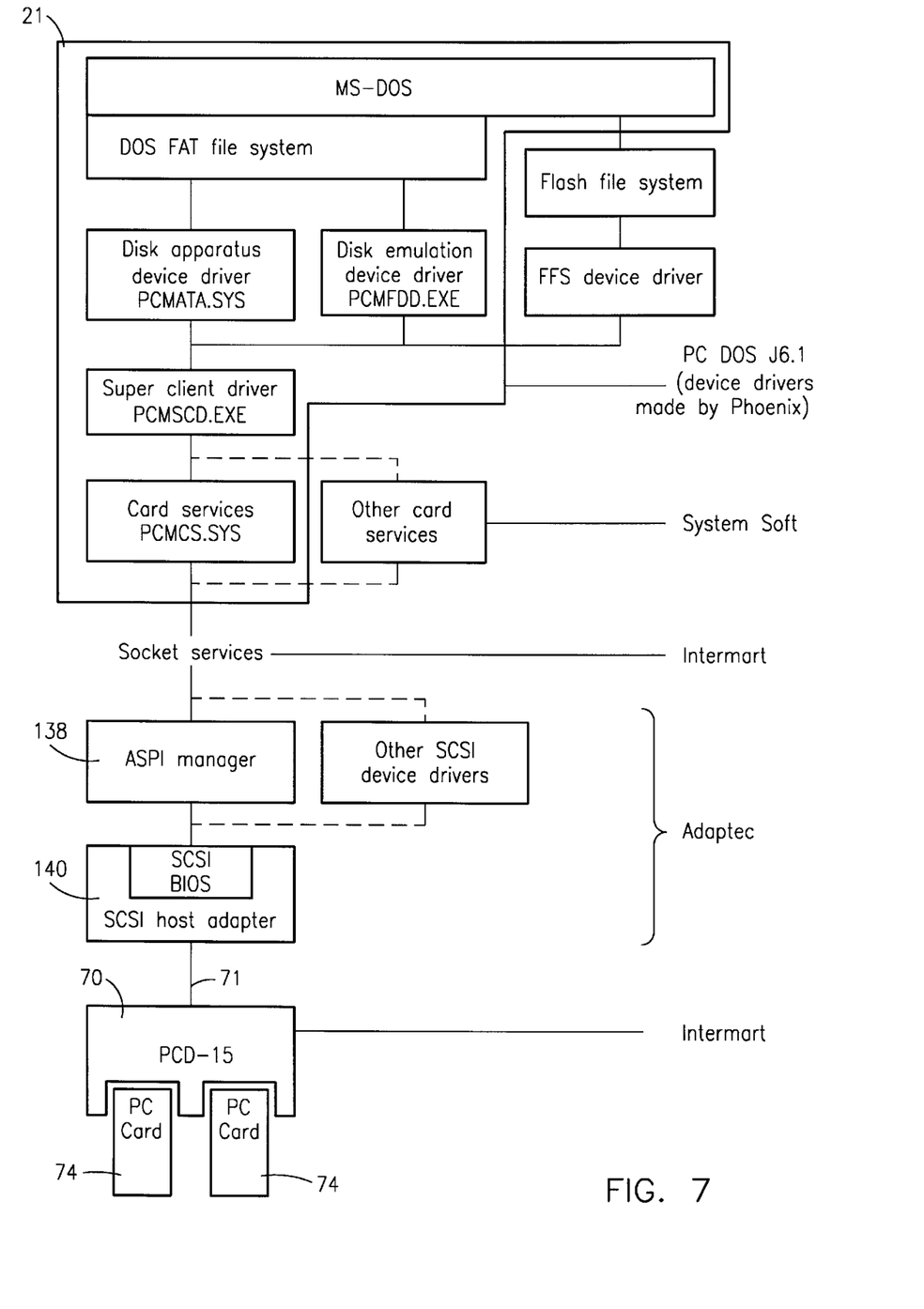
FIG. 7 is a block diagram of a second example of the connection of a PCMCIA read/write convertor to a computer system employing MS-DOS.

Referring now to FIG. 7, there is shown another example of the connection of the PCMCIA read/write adaptor 70 to a host computer 21 that employs MS-DOS as the operating system. Again, the system employs an Adaptec ASPI manager 138 and a SCSI host adaptor 140. In this example the device driver is included within the host computer 21.

Figure 8:
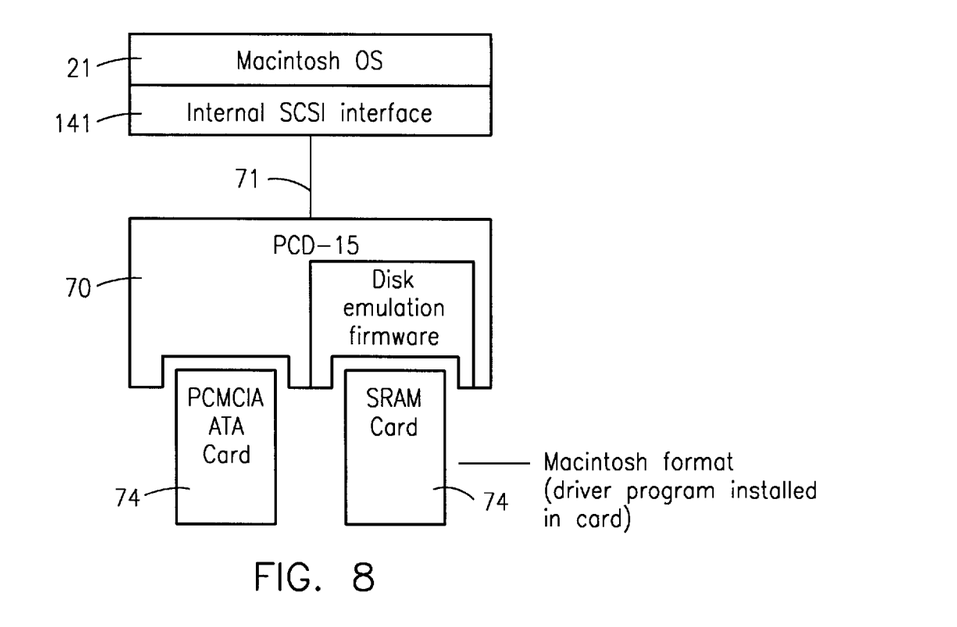
FIG. 8 is a block diagram of a PCMCIA read/write convertor of the present invention connected in a computer system employing a Macintosh computer.

Referring now to FIG. 8, there is shown a first example of the PCMCIA read/write adaptor 70 used with a Macintosh host computer 21. The Macintosh host computer 21 contains it's own internal SCSI interface 141. In this case, the PCMCIA card 74 employs a Macintosh format which includes a driver program installed therein.

Figure 9:
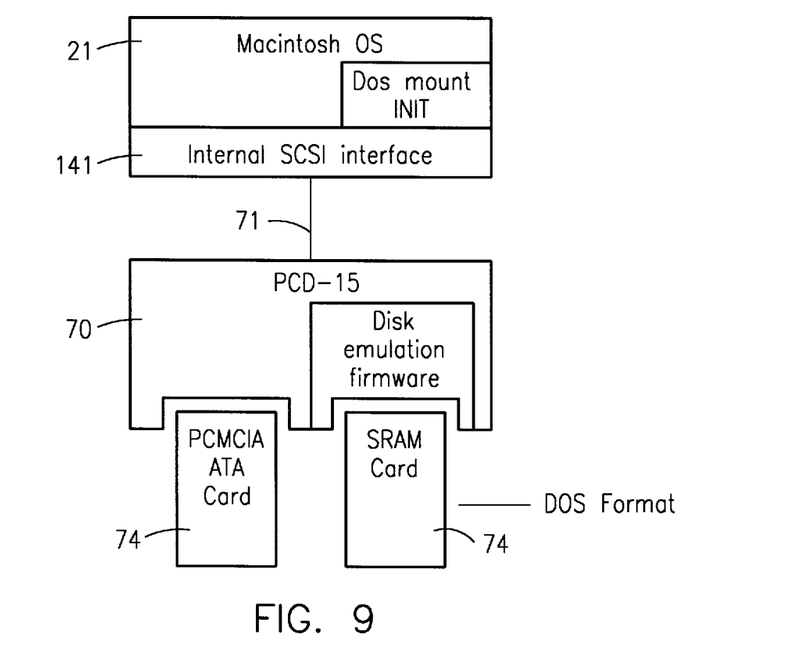
FIG. 9 is a block diagram of another example of the use of a PCMCIA read/write convertor of the present invention with a Macintosh computer.

Referring now to FIG. 9, there is shown another example of a PCMCIA read/write adaptor 70 used with a Macintosh host computer 21. In this example, the host computer 21 includes a DOS mount INIT and the PCMCIA card 74 employs a DOS format.

Figure 10:
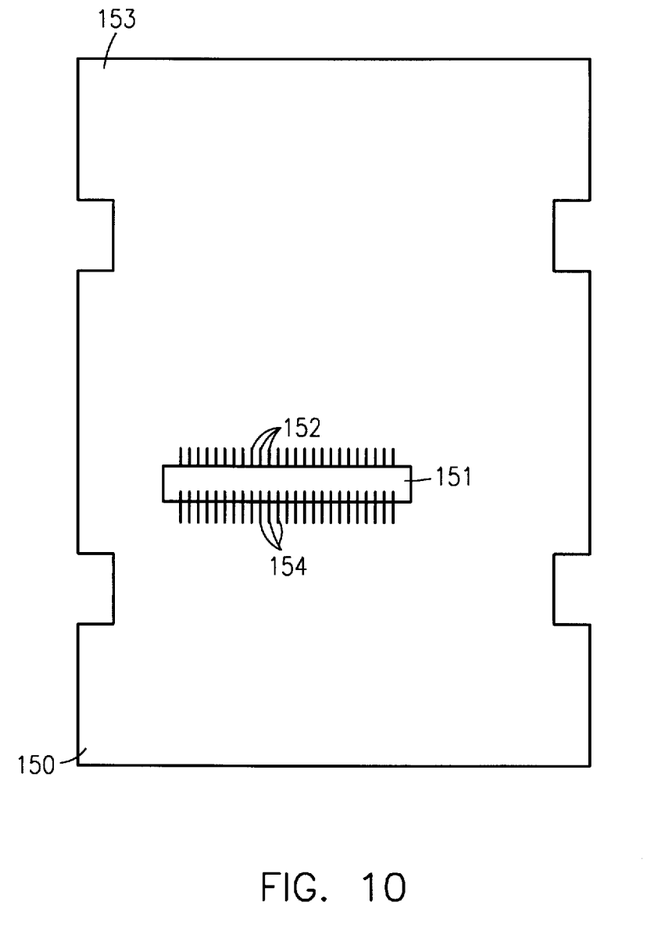
FIG. 10 is a plan view of a printed circuit board for the PCMCIA read/write convertor of the present invention.

FIG. 10 is a plan view of a printed circuit board 150 for use in a PCMCIA read/write convertor constructed in accordance with the principles of the present invention. The printed circuit board 150 has a thickness of substantially eight hundredths of an inch or greater. The printed circuit board 150 serves as a substrate for mounting a first surface-mount card connector 151. The connector 151 has a plurality of connector pins 152 for engaging a card (not shown) inserted from an outer edge 153 of the printed circuit card 150. The other side of the connector 151 has a plurality of electrical leads 154 for bonding to printed circuit traces (not shown).

Figure 11:
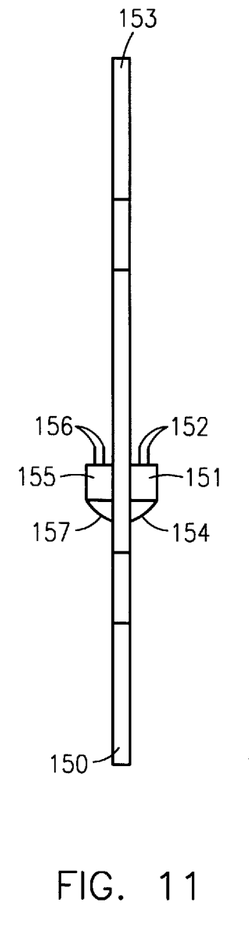
FIG. 11 is a side view of the printed circuit board of FIG. 10 showing two surface mount card connectors attached thereto.

FIG. 11 is a side view of the printed circuit board 150 shown in FIG. 10. A second surface-mount card connector 155 is mounted to the opposite side of the printed circuit board 150. The second connector 155 is also provided with connector pins 156 and electrical leads 157. The first and second connectors 151, 155 conform substantially to the Personal Computer Memory Card International Association (PCMCIA) standard. The thickness of the printed circuit board 150 along with the surface-mount connectors 151, 155 permits the insertion or removal of two cards at the same time.

Figure 12:
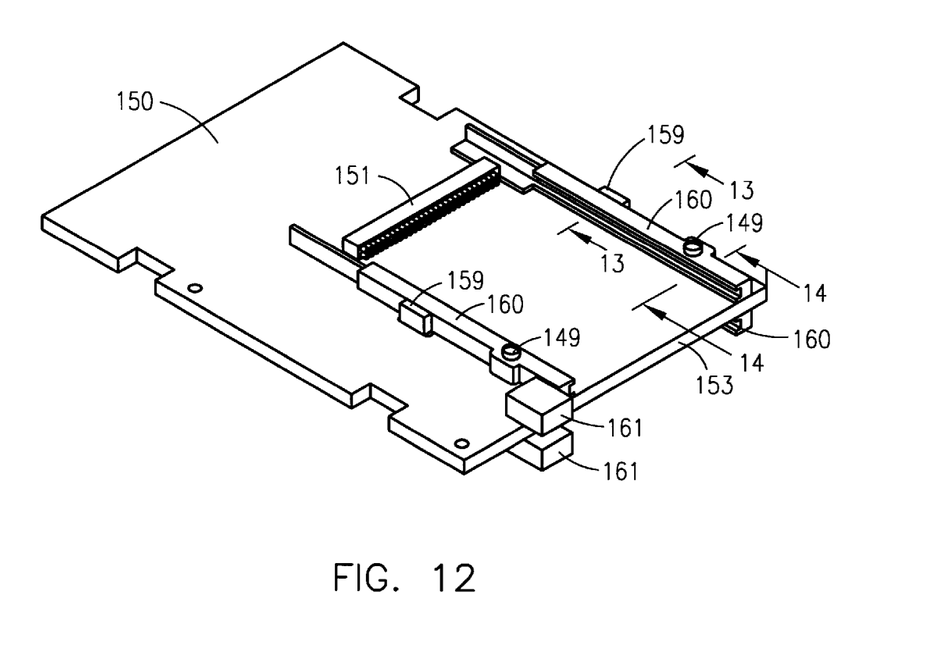
FIG. 12 is a perspective view of the printed circuit board of FIGS. 10 and 11 showing connector guides thereon having supports to prevent bending.

Referring now to FIG. 12, there is shown a perspective view of the printed circuit board 150 of FIGS. 10 and 11. The first surface mount card connector 151 is shown mounted between two connector guides 160. What is shown in FIG. 12 is a plurality of connector guides 160 extending from the outer edge 153 along the perimeter of the region where the cards (not shown) would be inserted. A fastener 149 mounts the connector guides 160 to the printed circuit board 150. These connector guides 160 typically are made as plastic rails, and are subject to being flexed or bent. Accordingly, it is a feature of the present invention that the connector guides 160 are provided with supports 159. The supports 159 are small metal pillars inserted in holes in the printed circuit board 150 which prevent the connector guides 160 from bending outward. This makes it difficult to insert a card with wrong or reverse card orientation. Release buttons 161 are shown to indicate a physical reference orientation.

Figure 13:
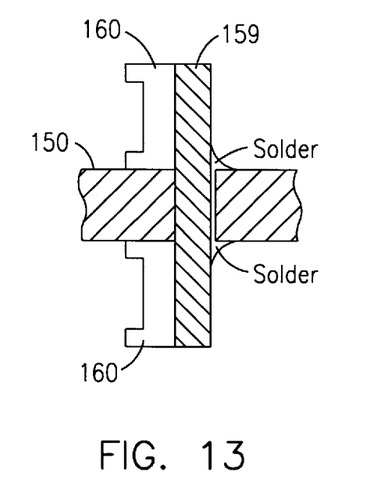
FIG. 13 is a cross-sectional elevation view to an enlarged scale of connector guides and their support taken along the lines 13—13 of FIG. 12.

FIG. 13 is a cross-sectional elevation view to an enlarged scale taken along the lines 13—13 of FIG. 12. In FIG. 13 there may be seen upper and lower connector guides 160 on opposite sides of the printed circuit board 150. The printed circuit board 150 is provided with an opening through which passes a small metal pillar support 159 which prevents the connector guides 160 from bending outwards. The metal pillar support 159 is soldered to metal pads provided on the top and bottom of the printed circuit board 150.

Figure 14:
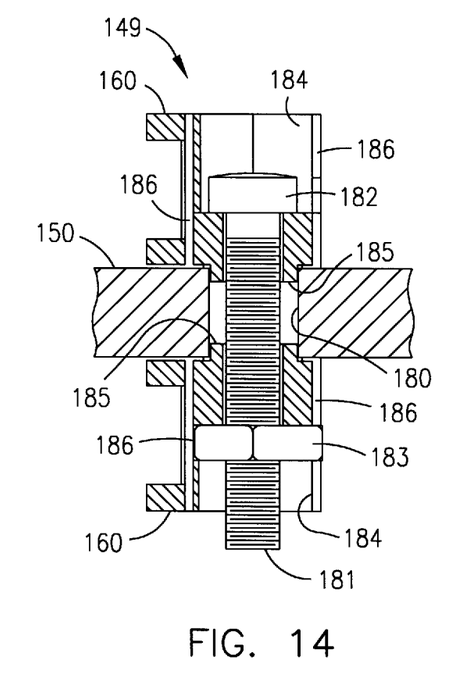
FIG. 14 is a cross-sectional elevation view of a connector guide fastener taken along the lines 14—14 of FIG. 12.

FIG. 14 is a cross-sectional elevation view of a fastener 149 to an enlarged scale taken along the lines 14—14 of FIG. 12. In FIG. 14 there may be seen upper and lower connector guides 160 on opposite sides of the printed circuit board 150. The printed circuit board 150 is provided with a hole 180 through which passes a machine screw 181 having a Phillips screw head 182 at the top, and a nut 183 at the bottom. The head 182 and the nut 183 are countersunk in hexagonal recesses 184 in the connector guides 160. The upper and lower connector guides 160 each have a shoulder 185 projecting into the hole 180. The screw 181 and nut 183 clamp the shoulders 185 in the hole 180 in the printed circuit board 150. The shoulders 185 are anchored in the hole 180. Metal stiffening members 186 are fitted into recesses provided in the connector guides 160.

The connector guides 160 as supplied by their manufacturer are very weak, so that even though the connector 151 incorporates a key (not shown) that is supposed to prevent reverse insertion of the card, if the user attempts to insert the card upside down and presses fairly hard, the guides 160 bend outwards allowing the card to slip past the key and the card may go in far enough to break the pins of the connector 151. It is a feature of the present invention that the separate metal supports 159 are added at the rear of the guides 160 to prevent the guides 160 from bending, thereby overcoming this problem.

Figure 15:
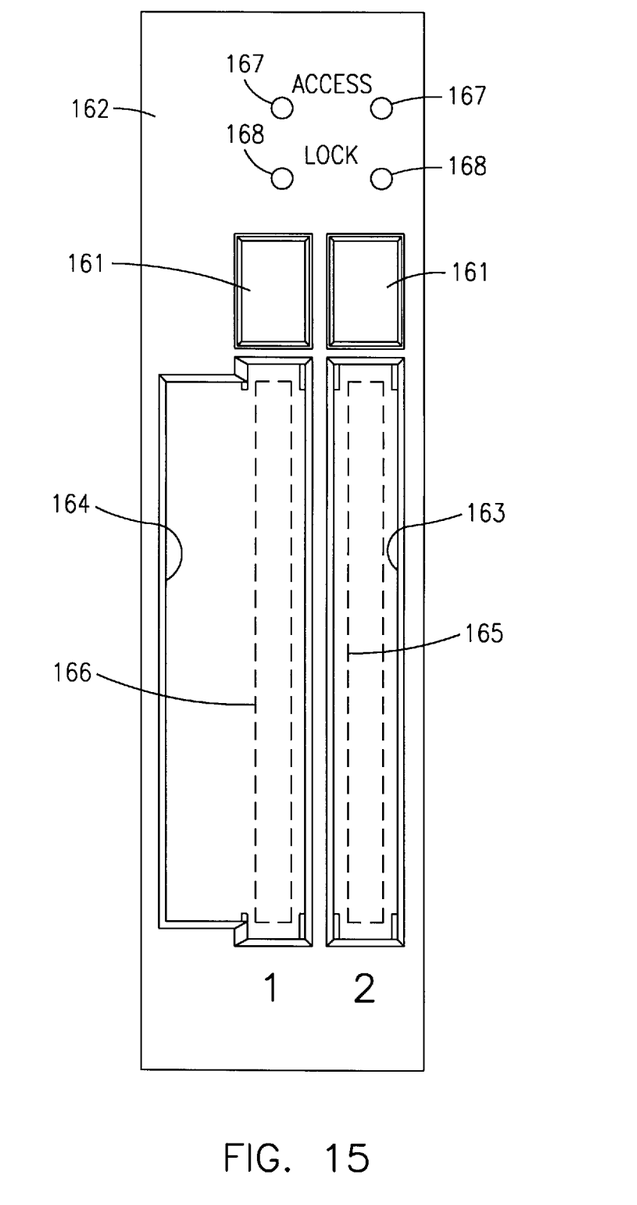
FIG. 15 is an elevation view of a front panel for the PCMCIA read/write convertor of the present invention.

FIG. 15 is an elevation view of a front panel 162 for a PCMCIA read/write convertor constructed in accordance with the principles of the present invention. This view is shown to an enlarged scale compared to FIGS. 10–12. The front panel 162 is provided with first and second card slots 163, 164, respectively. The first card slot 163 is to accommodate one Type II card, and the second card slot 164 is to accommodate one Type III card. When the PCMCIA read/write convertor is operatively assembled, the connector pins 152, 156 of the card connectors 151,155 may be seen disposed within the dashed rectangles 165, 166 within the card slots 163, 164. The front panel 162 is provided with green LED indicators 167 for ACCESS, and red LED indicators 168 for LOCK.

Figure 16:
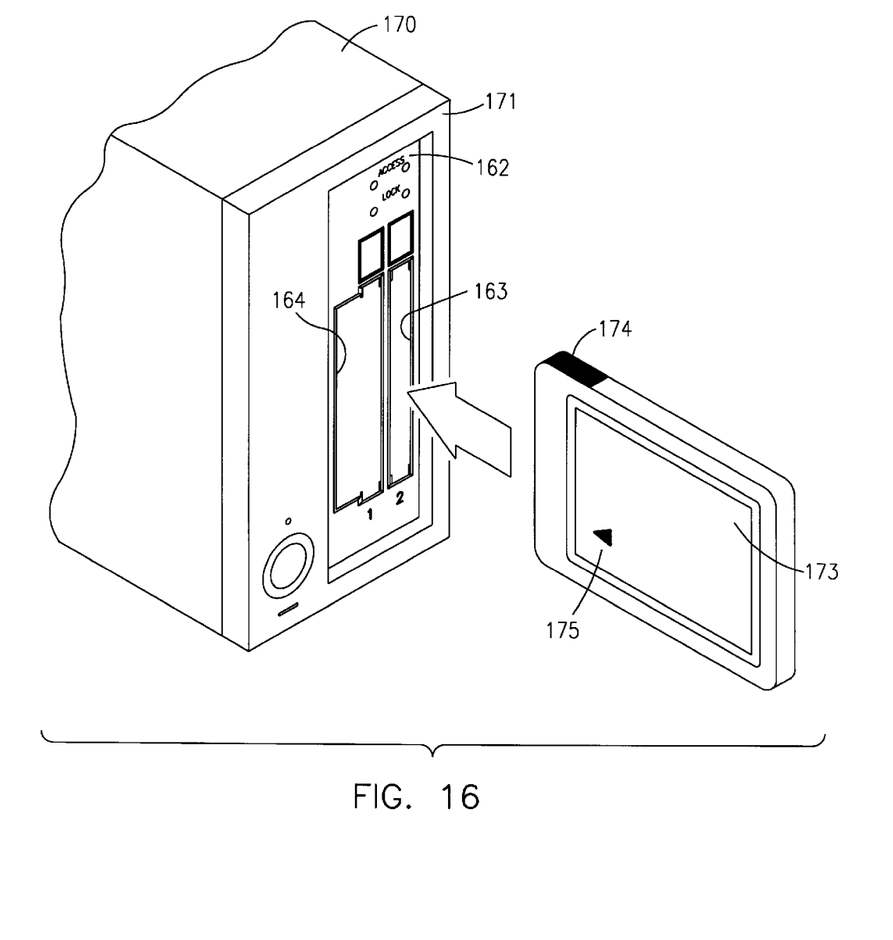
FIG. 16 is a broken away perspective view of a case having a bezel through which may be seen the front panel shown in FIG. 15.

FIG. 16 is a broken away perspective view of a case 170 having a bezel 171 through which may be seen the front panel 162 of FIG. 15. A PCMCIA card 173 is shown about to be inserted in the first card slot 163. A connector 174 is provided at one end of the card 173, and an orientation arrowhead 175 is shown properly aligned for insertion of the card 173.

When two identical cards 173 are inserted into the card slots 163, 164, they will have the same orientation because of the configuration of the two surface-mount card connectors 151, 155 (FIG. 11). The bezel 172 is operatively associated with the two surface-mount card connectors 151, 155. The bezel 172 has a first opening that is configured to allow the insertion of a card designated as Type III of the PCMCIA standard. The bezel 172 has a second opening configured to allow the insertion of a card designated as Type II of the PCMCIA standard. When two cards are in the first and second openings and engaged with the two surface-mount card connectors 151, 155 at the same time, it is possible to remove one of the cards because the thickness of the printed circuit board 150 allows the user to easily grasp only one of the two cards. As stated hereinbefore, the connector guides 160 have a plurality of supports 159 (FIG. 12 and FIG. 13) fastening them to the printed circuit board 150 which prevent lateral bending of the connector guides 160. The supports 159 which prevent the bending of the connector guides 160 make it difficult for a user to insert a card with the wrong orientation even if the card has slightly rounded corners. This prevents reverse card insertion.

The present invention has been particularly shown and described with respect to certain preferred embodiments and features thereof. However, it should be readily apparent to those of ordinary skill in the art that various changes and modifications in form and detail may be made without departing from the spirit and scope of the invention as set forth in the appended claims. The invention illustratively disclosed herein may be practiced without any element which is not specifically disclosed herein.

What is claimed is:

1. A convertor for transmitting data between a host computer compatible with an existing small computer systems interface (SCSI) standard and types of PCMCIA cards compatible with an existing personal computer memory card international association standard comprising:

a first connector conforming substantially to the small computer systems interface standard;

a second card connector conforming substantially to the personal computer memory card international association standard;

a circuit for converting input signals conforming substantially to the small computer systems interface standard to output signals conforming substantially to the personal computer memory card international association standard, said circuit being operatively coupled to said first and second connectors; and said circuit further comprising an operatively connected microprocessor for increasing the rate of data transfer between said host computer with SCSI interface and PCMCIA cards without using byte-by-byte data transfer.

2. The convertor of claim 1, further including a latch for converting two eight-bit data bytes into one sixteen-bit data word, thereby allowing use of the convertor with PCMCIA cards requiring sixteen-bit data input.

3. The convertor of claim 1, further including an automatically incrementing counter circuit for generating PCMCIA card addresses, thereby enabling data transfers at high speed.

4. The convertor of claim 1, where said microprocessor determines the type of PCMCIA card connected to the second connector and transmits card type information to the host computer.

5. In combination, apparatus for transferring data comprising:

an integrated circuit providing bus pins for connection to a data bus conforming substantially to the small computer systems interface standard and buffer pins for connection to a random access memory buffer;

a convertor circuit for converting signals from said buffer pins to signals acceptable to a predetermined peripheral device, said circuit being operatively converted to said integrated circuit; and a microprocessor unit coupled to said convertor circuit for initiating the conversion process, whereby data can be transferred at high speed between a host computer and said predetermined peripheral device without the necessity of byte-by-byte transfer of data by the microprocessor unit.

6. A PCMCIA read/write convertor comprising:

a card connector for connecting data signals to/from a PCMCIA card;

a SCSI interface ASIC coupled to said card connector for connecting a plurality of control signals, address signals, and data signals to/from a SCSI bus;

a microprocessor unit coupled to said card connector and to said SCSI interface ASIC for controlling the operation of the PCMCIA read/write convertor;

a gate array coupled to said card connector, said SCSI interface ASIC, and to said microprocessor unit for providing control signals in response to predetermined input signals; and a PC card interface, including first and second latches, a bus transceiver, and a tri-state buffer, said PC card interface being coupled to said card connector, said SCSI interface ASIC, to said microprocessor unit, and to said gate array for facilitating transfer of address signals and data signals between said card connector and said SCSI interface ASIC.

\* \* \* \* \*